(12) United States Patent
Keilers et al.

(10) Patent No.: US 11,507,133 B2
(45) Date of Patent: *Nov. 22, 2022

(54) CONFIGURABLE ALL-IN-ONE MODULAR DESKTOP COMPUTING SYSTEM

(71) Applicant: Dell Products L.P., Round Rock, TX (US)

(72) Inventors: Cyril Adair Keilers, Georgetown, TX (US); Shawn Paul Hoss, Georgetown, TX (US); Christopher Michael Helberg, Austin, TX (US); David G. Methven, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/316,491

(22) Filed: May 10, 2021

(65) Prior Publication Data

US 2021/0263553 A1 Aug. 26, 2021

Related U.S. Application Data

(63) Continuation of application No. 16/657,831, filed on Oct. 18, 2019, which is a continuation of application
(Continued)

(51) Int. Cl.
*G06F 1/16* (2006.01)
*G06F 1/18* (2006.01)
*G06F 1/20* (2006.01)

(52) U.S. Cl.
CPC .......... *G06F 1/1601* (2013.01); *G06F 1/1632* (2013.01); *G06F 1/1656* (2013.01);
(Continued)

(58) Field of Classification Search
CPC .......... G06F 1/1601; G06F 1/181; G06F 1/20; G06F 2200/1631; G06F 1/1656; G06F 1/1658; G06F 1/1632
See application file for complete search history.

(56) References Cited

U.S. PATENT DOCUMENTS 6,081,420 A * 6/2000 Kim .......................... G06F 1/16
361/679.06
6,216,999 B1 * 4/2001 Olson ..................... G06F 1/187
248/694

(Continued)

*Primary Examiner* — Nidhi Thaker
(74) *Attorney, Agent, or Firm* — Joseph Mencher

(57) ABSTRACT

A modular desktop computing system includes a display stand chassis having a display stand base, a display stand support member extending from the display stand base and including a display device mounting subsystem, and a display stand cover removeably coupled to the display stand support member to define a computing module housing between the display stand support member and the display stand cover. A display device is removeably mounted to the display device mounting subsystem. A computing module is located in the computing module housing. The computing module includes a computing module chassis removeably positioned in the computing module housing and housing: a processing system coupled to the display device, and a memory system coupled to the processing system. The memory system includes instructions that, when executed by the processing system, cause the processing system to provide for the display of images on the display device.

20 Claims, 18 Drawing Sheets

Related U.S. Application Data

No. 16/010,195, filed on Jun. 15, 2018, now Pat. No. 10,452,096.

(52) U.S. Cl.
CPC ............... *G06F 1/181* (2013.01); *G06F 1/20* (2013.01); *G06F 2200/1613* (2013.01); *G06F 2200/1631* (2013.01); *G06F 2200/1634* (2013.01)

(56) References Cited

U.S. PATENT DOCUMENTS

| | | | |
|---|---|---|---|
| 6,788,530 B2 | 9/2004 | Hill et al. | |
| 6,954,353 B2 * | 10/2005 | Olson | G06F 1/181 348/836 |
| 7,145,767 B2 * | 12/2006 | Mache | G06F 1/1601 361/679.21 |
| 7,471,511 B2 | 12/2008 | Montag et al. | |
| 7,555,581 B2 * | 6/2009 | Martin | G06F 1/1601 710/62 |
| 8,144,452 B2 | 3/2012 | Huang et al. | |
| 8,248,780 B2 * | 8/2012 | Zheng | G06F 1/16 361/679.48 |
| 8,537,532 B2 | 9/2013 | Chen et al. | |
| 8,717,755 B2 * | 5/2014 | Haren | G06F 1/1632 361/679.41 |
| 10,108,221 B1 * | 10/2018 | Gu | G06F 1/16 |
| 10,492,316 B2 * | 11/2019 | Sung | H05K 5/0217 |
| 2003/0063059 A1 * | 4/2003 | Farrow | G06F 1/16 345/92 |
| 2006/0198097 A1 * | 9/2006 | Kuwajima | H04N 5/775 386/E5.07 |
| 2007/0084625 A1 * | 4/2007 | Martin | H02G 3/04 174/135 |
| 2007/0097609 A1 * | 5/2007 | Moscovitch | G06F 3/1438 361/679.04 |
| 2007/0168593 A1 * | 7/2007 | Montag | G06F 1/1601 710/303 |
| 2011/0222231 A1 * | 9/2011 | Huang | G06F 1/187 361/679.21 |
| 2012/0162949 A1 * | 6/2012 | Han | F16M 11/38 361/803 |
| 2012/0163645 A1 * | 6/2012 | Hwang | H05K 5/02 381/333 |
| 2013/0010418 A1 * | 1/2013 | Flynn | G06F 1/1613 361/679.21 |
| 2013/0021747 A1 * | 1/2013 | Guan | G06F 1/1601 361/679.47 |
| 2016/0161996 A1 * | 6/2016 | Fan | G06F 1/187 361/679.33 |
| 2017/0329364 A1 | 11/2017 | Kim et al. | |

* cited by examiner

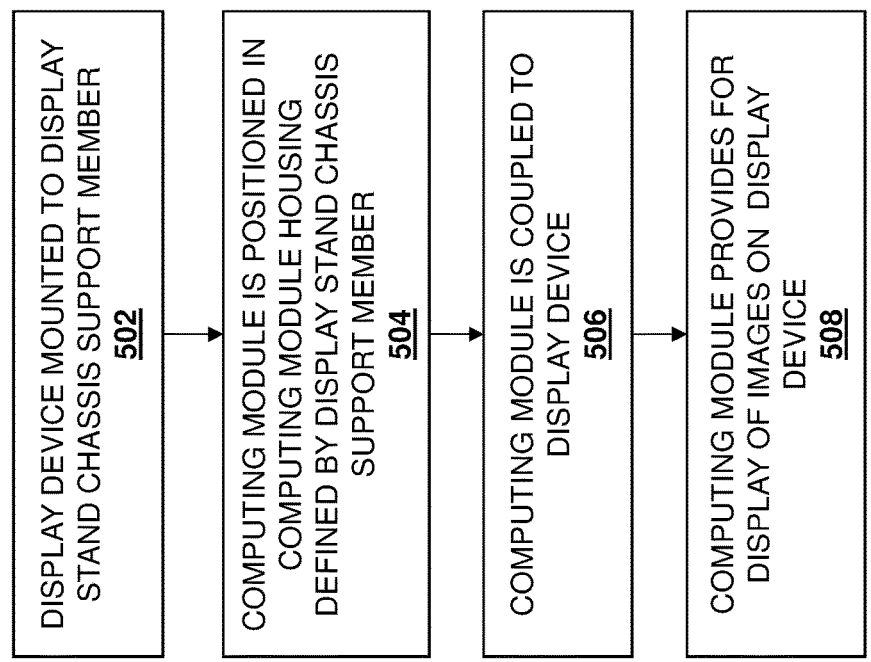

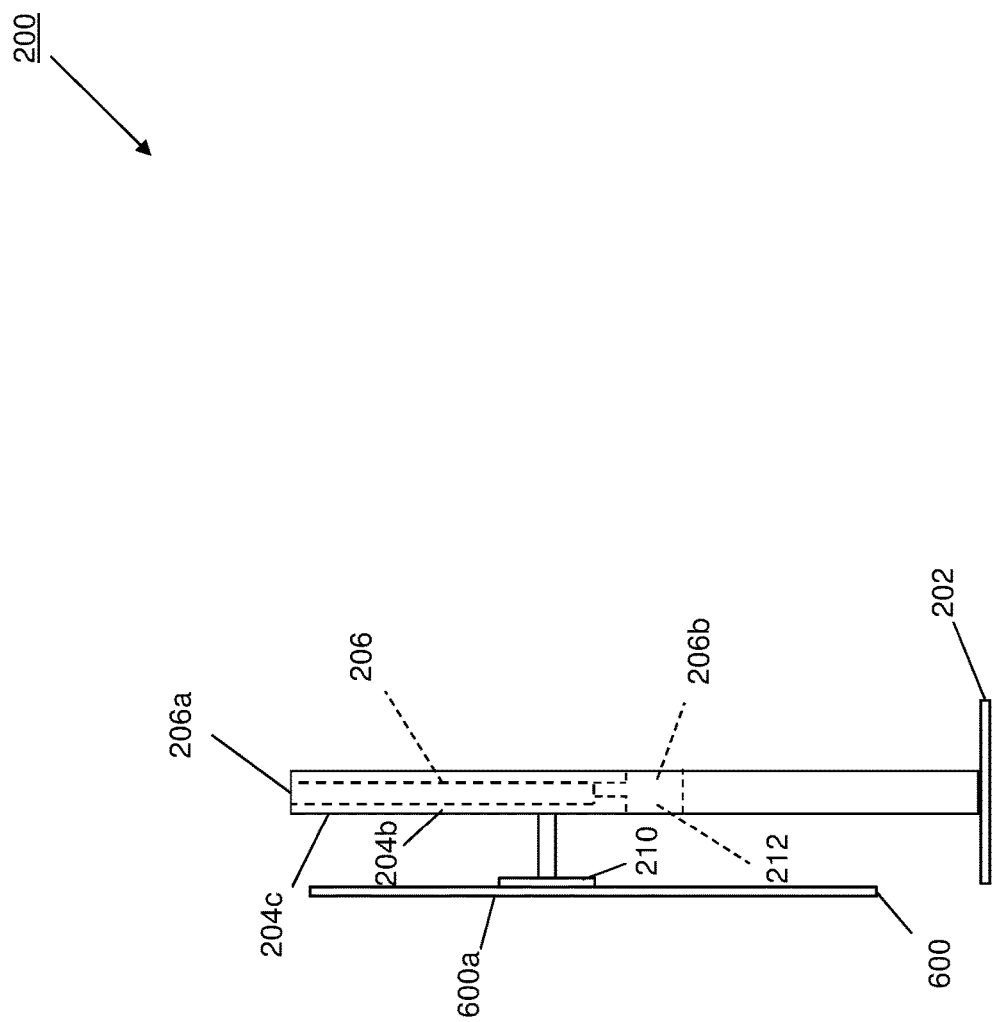

CONFIGURABLE ALL-IN-ONE MODULAR DESKTOP COMPUTING SYSTEM

CROSS-REFERENCE TO RELATED APPLICATIONS

This application is a continuation of U.S. patent application Ser. No. 16/657,831, filed Oct. 18, 2019, entitled "CONFIGURABLE ALL-IN-ONE MODULAR DESKTOP COMPUTING SYSTEM,", which is a continuation of U.S. patent application Ser. No. 16/010,195, filed Jun. 15, 2018, entitled "CONFIGURABLE ALL-IN-ONE MODULAR DESKTOP COMPUTING SYSTEM,", now U.S. Pat. No. 10,452,096, issued Oct. 22, 2019, the disclosures of which are incorporated herein by reference in their entirety.

BACKGROUND

The present disclosure relates generally to information handling systems, and more particularly to a modular desktop information handling system that is configurable as an all-in-one computing device.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A growing trend in information handling systems is the "all-in-one" desktop computing system, also referred to as all-in-one Personal Computers (PCs). All-in-one desktop computing systems integrate the computing system chassis and computing system components into the display device so that the entire desktop computing system is provided as a single unit. All-in-one desktop computing systems typically provide a smaller form factor relative to non-all-in-one desktop computing systems, but are associated with higher costs, weaker performance, and limited upgrade options relatively to convention desktop computing systems. In particular, non-all-in-one desktop computing systems allow a user to upgrade their performance by adding or changing components, while all-in-one desktop computing systems are typically limited to the components that were initially integrated into the display device. As such, a user that purchases an all-in-one desktop computing system will be "stuck" with the integrated display device, processing system, memory system, storage system, and/or other computing components that were initially provided with the all-in-one desktop computing system, and must purchase a new all-in-one desktop computing system if an upgrade of the performance of the all-in-one desktop computing system is desired.

Accordingly, it would be desirable to provide an improved all-in-one desktop computing system.

SUMMARY

According to one embodiment, an Information Handling System (IHS) includes a display stand chassis base; a display stand chassis support member that extends from the display stand chassis base and that includes a display device mounting subsystem that is configured to removeably mount to a display device; and a display stand chassis cover that is configured to removeably couple to the display stand support member to define a computing module housing between the display stand support member and the display stand cover, wherein the computing module housing is configured to removeably house a computing module that includes a processing system that is configured to couple to the display device, and a memory system that is coupled to the processing system and that includes instructions that, when executed by the processing system, cause the processing system to provide for the display of images on the display device.

BRIEF DESCRIPTION OF THE DRAWINGS

FIG. 5 is a flow chart illustrating an embodiment of a method for providing a modular desktop computing system that is configurable as an all-in-one computing device.

FIG. 6C is a partial, cross-sectional side view illustrating an embodiment of the computing module, display stand chassis, and display device of FIGS. 6A and 6B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
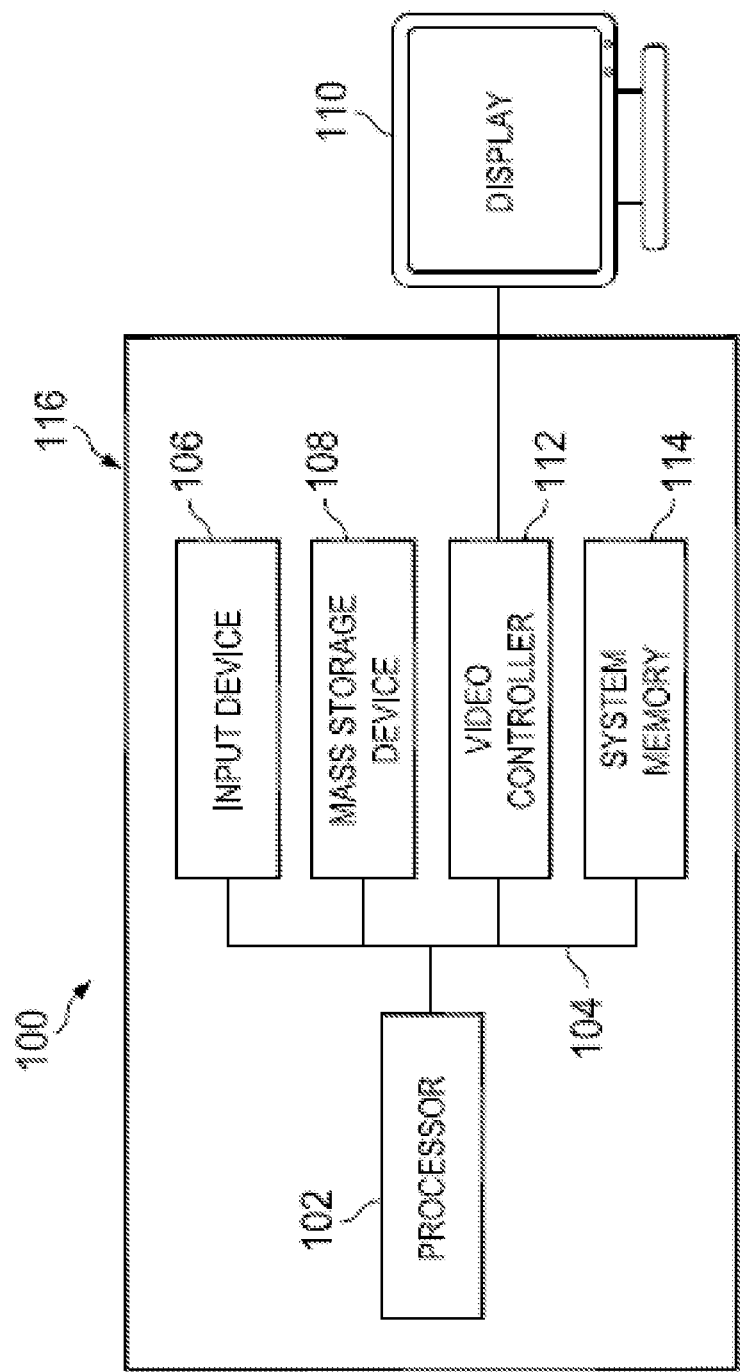
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
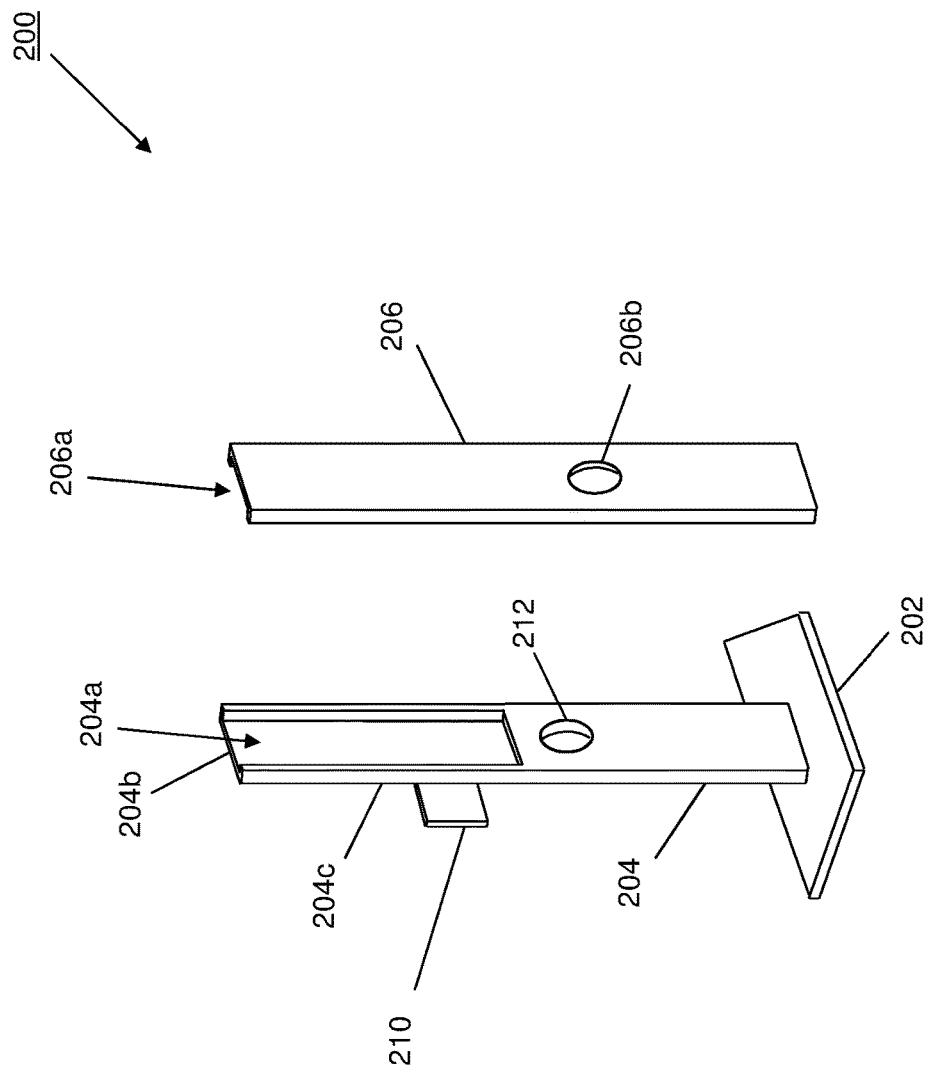
FIG. 2A is an exploded perspective view illustrating an embodiment of a display stand chassis.
Figure 2B:
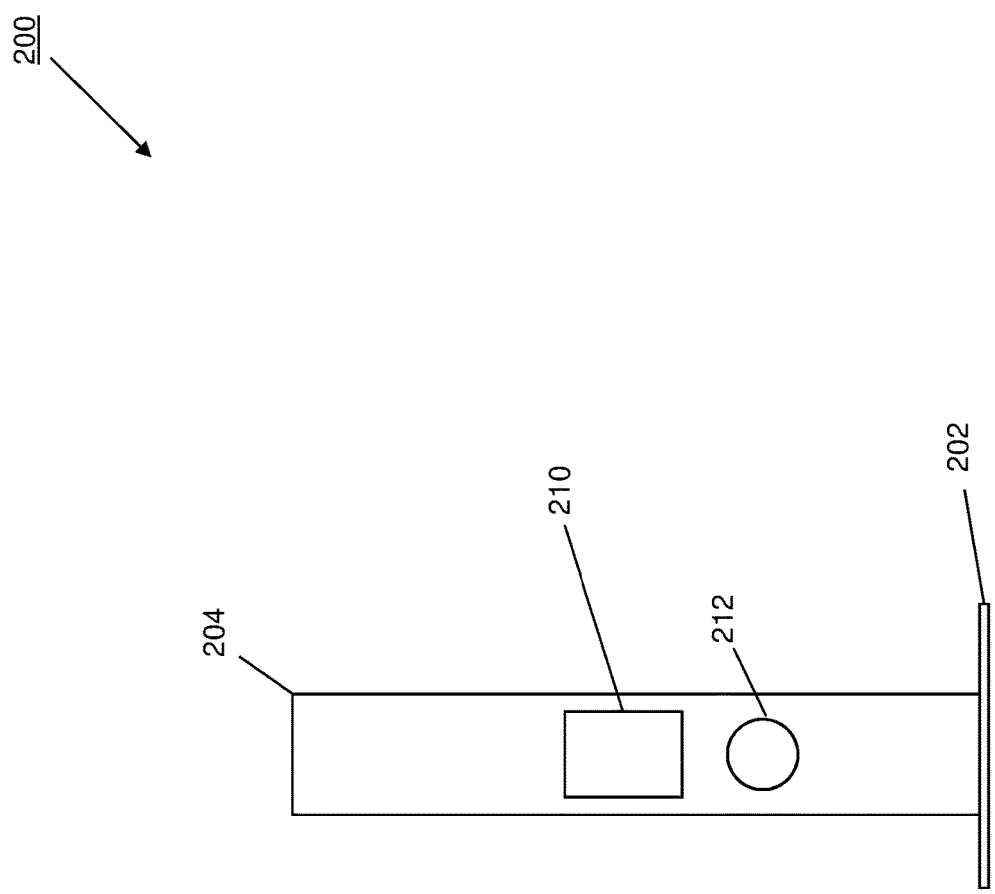
FIG. 2B is a front view illustrating an embodiment of the display stand chassis of FIG. 2A.
Figure 2C:
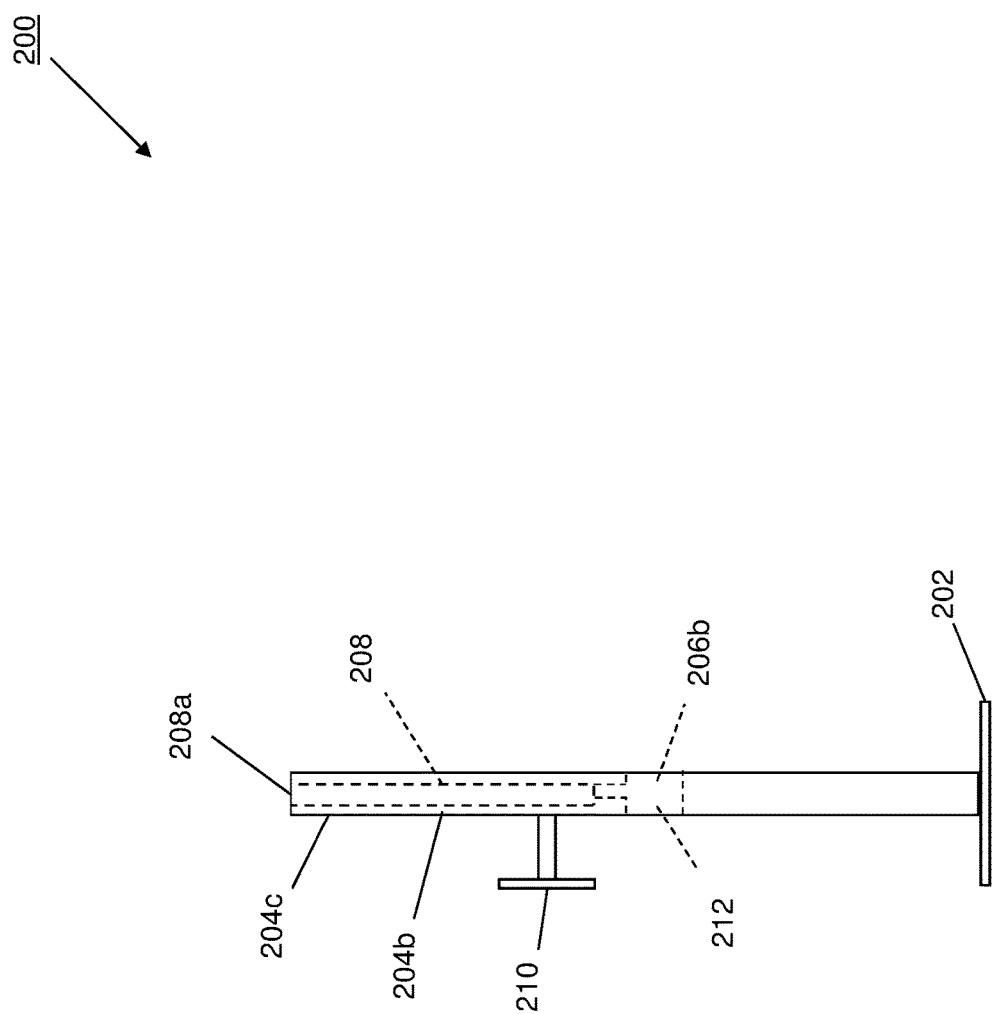
FIG. 2C is a partial, cross-sectional side view illustrating an embodiment of the display stand chassis of FIGS. 2A and 2B.

Referring now to FIGS. 2A, 2B, and 2C, an embodiment of display stand chassis 200 is illustrated that may be utilized to provide the modular desktop computing system of the present disclosure that is configurable as an all-in-one computing device. As will be appreciated by one of skill in the art in possession of the present disclosure, the modular desktop computing system of the present disclosure may provide a version of the IHS 100 discussed above with reference to FIG. 1 and, as such, may include some or all of the components of the IHS 100. As discussed below, the modular desktop computing system of the present disclosure is provided by a computing module that provides the compute functionality (e.g., processing, storage, networking, etc.) of the modular desktop computing system, with that computing module housed in the display stand chassis 200 that supports a display device. Furthermore, the inventors of the present disclosure have developed a number of system and subsystem improvements that may be utilized with the modular desktop computing system of the present disclosure, and those improvements are described in U.S. patent application Ser. No. 16/010,013, filed on Jun. 15, 2018; U.S. patent application Ser. No. 15/973,203, filed on May 7, 2018; U.S. patent application Ser. No. 15/987,752, filed on May 23, 2018; and U.S. patent application Ser. No. 15/973,234, filed on May 7, 2018; the disclosures of which are incorporated by reference herein in their entirety.

In the illustrated embodiment, the display stand chassis 200 includes a display stand base 202, with a display stand support member 204 that is mounted to and extends substantially perpendicularly from the display stand base 202. As discussed below, the mounting of the display stand support member 204 to the display stand base 202 may be a removeable mounting that allows different display stand support members to be mounted to the display stand base 202, as discussed below. As such, the display stand base 202 and the display stand support member 204 may include a variety of coupling, securing, and release features that would be apparent to one of skill in the art in possession of the present disclosure as providing for the removeable coupling of the two.

For example, in the illustrated embodiment, the display stand support member 204 defines a first display stand housing portion 204a adjacent a display stand wall 204b that includes a display stand outer surface 204c. Furthermore, the display stand chassis 200 in the illustrated embodiment also includes a display stand cover 206 that defines a second display stand housing portion 206a, with the display stand cover 206 configured to couple to the display stand support member 204 such that the first display stand housing portion 204a and the second display stand housing portion 206a define a display stand chassis housing 208. In some embodiments, the display stand chassis 200 may be provided with a first display stand support member that is configured (e.g., with the display stand cover 206) to define a first sized display stand housing, or may be provided with a second display stand support member that is configured (e.g., with the display stand cover 206) to define a second sized display stand housing that is larger than the first display stand housing. As such, as discussed below, different display stand support members may be mounted and secured to, and removed from the display stand base 202 in order to be replaced by other display stand support members to provide a variety of benefits, only some of which are discussed below. In a specific example, the display stand chassis 200 may include a Kensington-type security slot that support Kensington-type locks that may be configured to, for example, secure the display stand cover 206 to the display stand support member 204 in order to prevent access to the computing module 300, discussed in further detail below.

In the illustrated embodiment, the display stand chassis housing 208 includes a display stand heat dissipation aperture 208a that is located opposite the display stand chassis 202 from the display stand base 202. As discussed in further detail below, the display stand heat dissipation aperture 208a may provide an air outlet for the display stand chassis housing 208 and computing module 300. As illustrated, the display stand support member 204 includes a display device mounting subsystem 210 that extends from the display stand outer surface 204c, and which may include a variety of display stand mounting subsystems known in the art such as, for example, display stand mounting subsystems defined by the Video Electronics Standards Association (VESA). In addition, the display stand cover 206 may also define a display stand cover aperture 206b that, as discussed below, provides an air inlet that allows for air to be drawn into the display stand chassis housing 208 and the computing module 300. Furthermore, the display stand support member 204 may also define a display stand support member aperture 212 that extends through the display stand support member 204 and that is located adjacent the display stand cover aperture 206b in order to define a cable routing aperture through the display stand chassis 200.

Figure 3A:
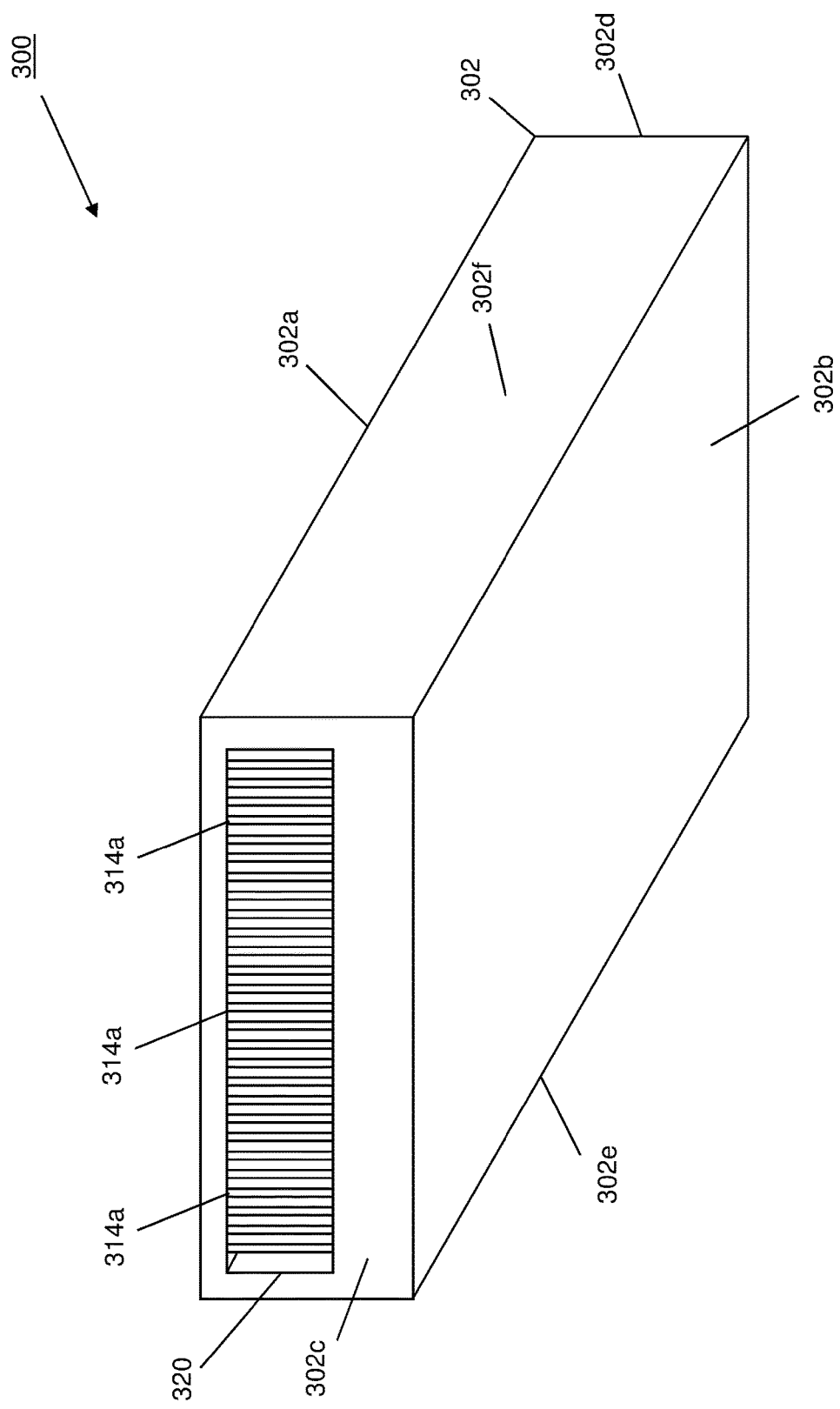
FIG. 3A is a bottom perspective view illustrating an embodiment of a computing module.
Figure 3B:
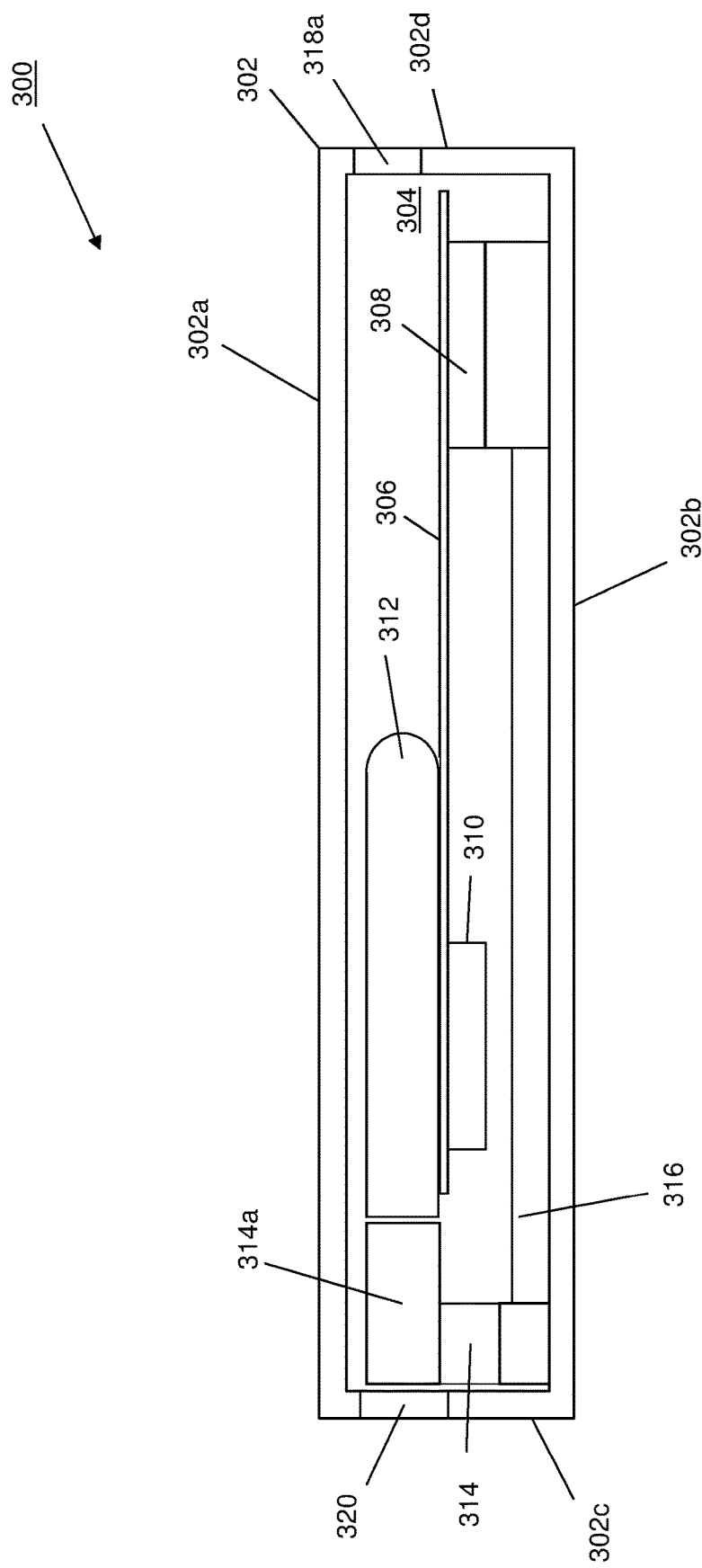
FIG. 3B is a partial, cross-sectional side view illustrating an embodiment of the computing module of FIG. 3A.
Figure 3C:
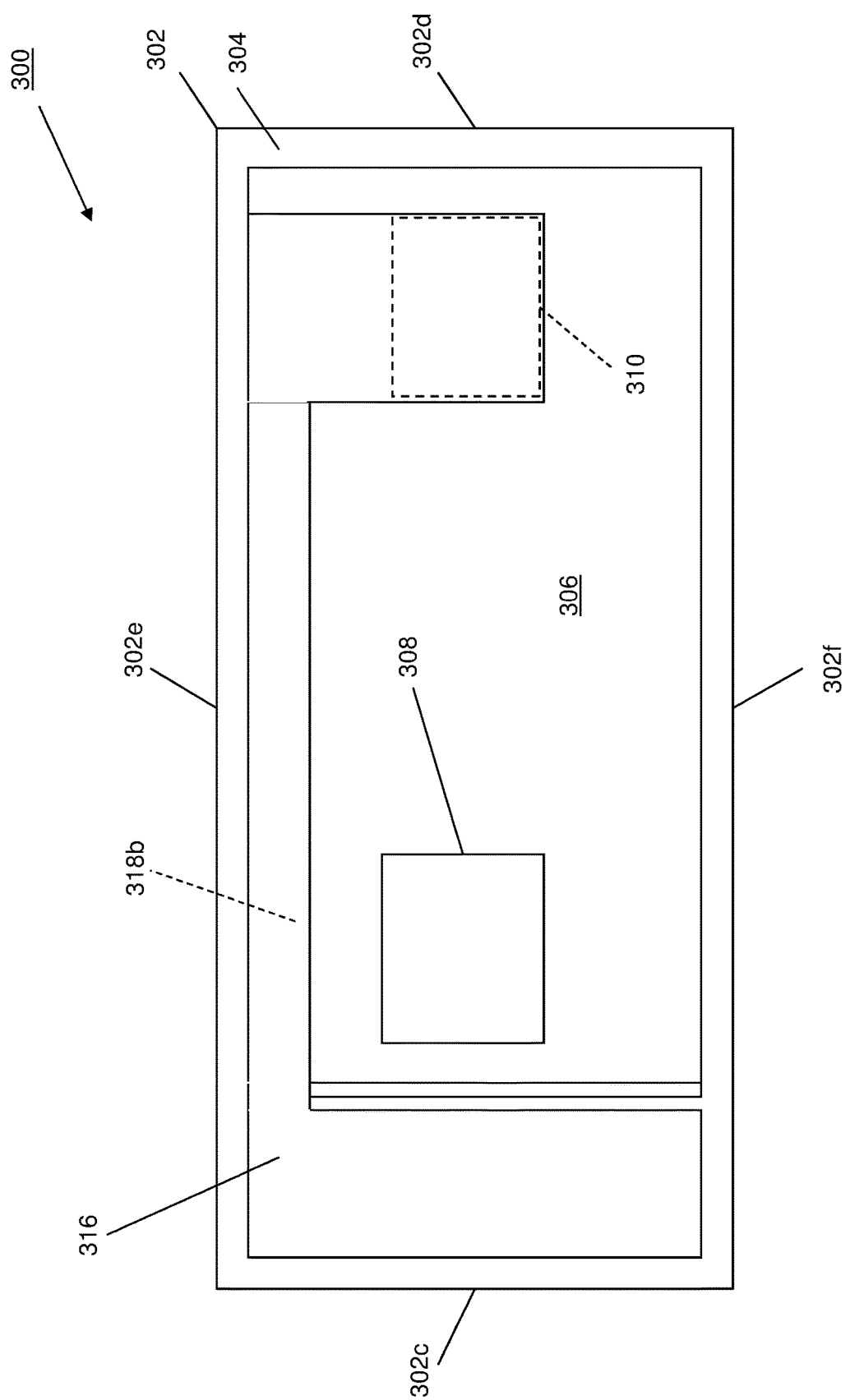
FIG. 3C is a partial, cross-sectional bottom view illustrating an embodiment of the computing module of FIGS. 3A and 3B.

Referring now to FIGS. 3A, 3B, and 3C, an embodiment of a computing module 300 is illustrated. In an embodiment, the computing module 300 may be the IHS 100 of FIG. 1, and/or may include some or all of the components of the IHS 100. As discussed above, the computing module 300 may be housed in the display stand chassis 200 of FIGS. 2A, 2B, and 2C, and coupled to a display device on that display stand chassis 200. However, the teaching of the present disclosure may be beneficial to a variety of devices and/or systems, and thus those devices and systems are envisioned as falling within the scope of the present disclosure as well. In the illustrated embodiment, the computing module 300 includes a computing chassis 302 that may house components (e.g., of the IHS 100), only some of which are illustrated in FIGS. 3A-C. The computing chassis 302 includes a computing chassis top outer surface 302a, a computing chassis bottom outer surface 302b that is located opposite the computing chassis 302 from the computing chassis top outer surface 302a, a computing chassis front outer surface 302c that extends between the computing chassis top outer surface 302a and the computing chassis bottom outer surface 302b, a computing chassis rear outer surface 302d that is located opposite the computing chassis 302 from the computing chassis front outer surface 302c and that extends between the computing chassis top outer surface 302a and the computing chassis bottom outer surface 302b, and a pair of opposing computing chassis side outer surfaces 302e and 302f that are located opposite the computing chassis 302 from each other and that extend between the computing chassis top outer surface 302a, the computing chassis bottom outer surface 302b, the computing chassis front outer surface 302c, and the computing chassis rear outer surface 302d.

As illustrated in FIGS. 3B and 3C, the computing chassis 302 defines a computing chassis housing 304 between the computing chassis top outer surface 302a, the computing chassis bottom outer surface 302b, the computing chassis front outer surface 302c, the computing chassis rear outer surface 302d, and the computing chassis side outer surfaces 302e and 202f, and that computing chassis housing 304 may be utilized to house components (e.g., of the IHS 100). As can be seen in FIGS. 3B and 3C, the components housed in the computing chassis housing 304 may include a board 306 (e.g., a motherboard) to which a first component 308 and a second component 310 are mounted. In some embodiments, the first component 308 and/or the second component 310 may be provided by, for example, a processing system (e.g., a Central Processing Unit (CPU)), a memory system (e.g., Dynamic Random Access Memory (DRAM) devices), and/or a variety of other computing devices that would be apparent to one of skill in the art in possession of the present disclosure. However, in other embodiments, the first and second components (and/or other components in the computing chassis housing 304) may be provided by any devices that would be apparent to one of skill in the art in possession of the present disclosure. While not described herein in detail the computing chassis 302 may be opened by a user to add or replace components (e.g., a processor, memory devices, networking devices, storage devices, etc.) using any of a variety of techniques known in the art.

In the illustrated embodiment, a forced convection device 312 is located on the board 306 and in the computing chassis housing 304 between the board 306 and the computing chassis wall of the computing chassis 302 that includes the computing chassis top outer surface 302a. The forced convection device 312 may be provided by a fan, a blower, and/or other forced convection devices that would be apparent to one of skill in the art in possession of the present disclosure. A heat dissipation structure 314 is located in the computing chassis housing 304 adjacent the forced convection device 312, and in the illustrated embodiment includes a plurality of spaced apart heat dissipation fins 314a that define a plurality of airflow channels (i.e., between the heat dissipation fins 314a) extending from the forced convection device 312. A heat transfer device 316 (e.g., a heat pipe, a vapor chamber, or other heat transfer subsystem that would be apparent to one of skill in the art in possession of the present disclosure) is located in the computing chassis housing 304, engages the heat dissipation structure 314, extends through the computing chassis housing 304 while engaging the computing chassis wall that includes the bottom outer surface 302b of the computing chassis 302, and engages the first heat producing component 308.

While not illustrated, one of skill in the art in possession of the present disclosure will recognize that thermal substrates (e.g., heat transfer pastes) may be provided between the engagement of the heat transfer device 316 and the heat dissipation structure 314, the engagement of the heat transfer device 316 and the computing chassis wall that includes the bottom outer surface 302b of the computing chassis 302, and the engagement of the heat transfer device 316 and the first heat producing component 308 (e.g., the engagement of the evaporator side of the heat pipe and a Central Processing Unit (CPU)). While the heat transfer device 316 is described as a heat pipe that engages the computing chassis wall that includes the bottom outer surface 302b of the computing chassis 302, in other embodiments the heat transfer device 316 may be integrated, embedded, or otherwise engaged with the computing chassis wall that includes the bottom outer surface 302b of the computing chassis 302 in a variety of manners that will fall within the scope of the present disclosure as well.

In the illustrated embodiment, a computing chassis housing air inlet 318a is defined by the computing chassis wall of the computing chassis 302 that includes the computing chassis rear outer surface 302d. As discussed below, the computing chassis housing air inlet 318a is configured to allow air to be drawn from outside the computing chassis 302 and into the computing chassis housing 304 to the forced convection device 312. Furthermore, a computing chassis heat dissipation aperture 320 is defined by the wall of the computing chassis 302 that includes the computing chassis front outer surface 302c of the computing chassis 302, and is located immediately adjacent the heat dissipation fins 314a and opposite the heat dissipation fins 314a from the forced convection device 312. As discussed below, the forced convection device 312 is configured to produce an airflow that is directed through the channels defined by the heat dissipation fins 314a, and out the computing chassis heat dissipation aperture 320. However, while specific air inlets and outlets have been illustrated and described, one of skill in the art in possession of the present disclosure will recognize that air inlets and outlets for the computing module 300 may be located in a variety of locations that will fall within the scope of the present disclosure.

While not illustrated, the computing module 300 may include a variety of connectors for connecting the computing module 300 to a display device (discussed below), a power supply, peripheral devices, and/or other devices known in the art. For example, such connectors may include Universal Serial Bus (USB) connectors (e.g., USB Type C connectors), networking connectors (e.g., RJ45 connectors), audio connectors (e.g., Universal Audio Jack (UAJ) connectors), video connectors (e.g., Display Port connectors), power connectors (e.g., Direct Current (DC) connectors), and/or any other connector that would be apparent to one of skill in the art in possession of the present disclosure. While a specific computing module 300 has been described, one of skill in the art in possession of the present disclosure will recognize that computing modules may include a variety of other components and/or component configurations that will fall within the scope of the present disclosure as well.

Figure 4:
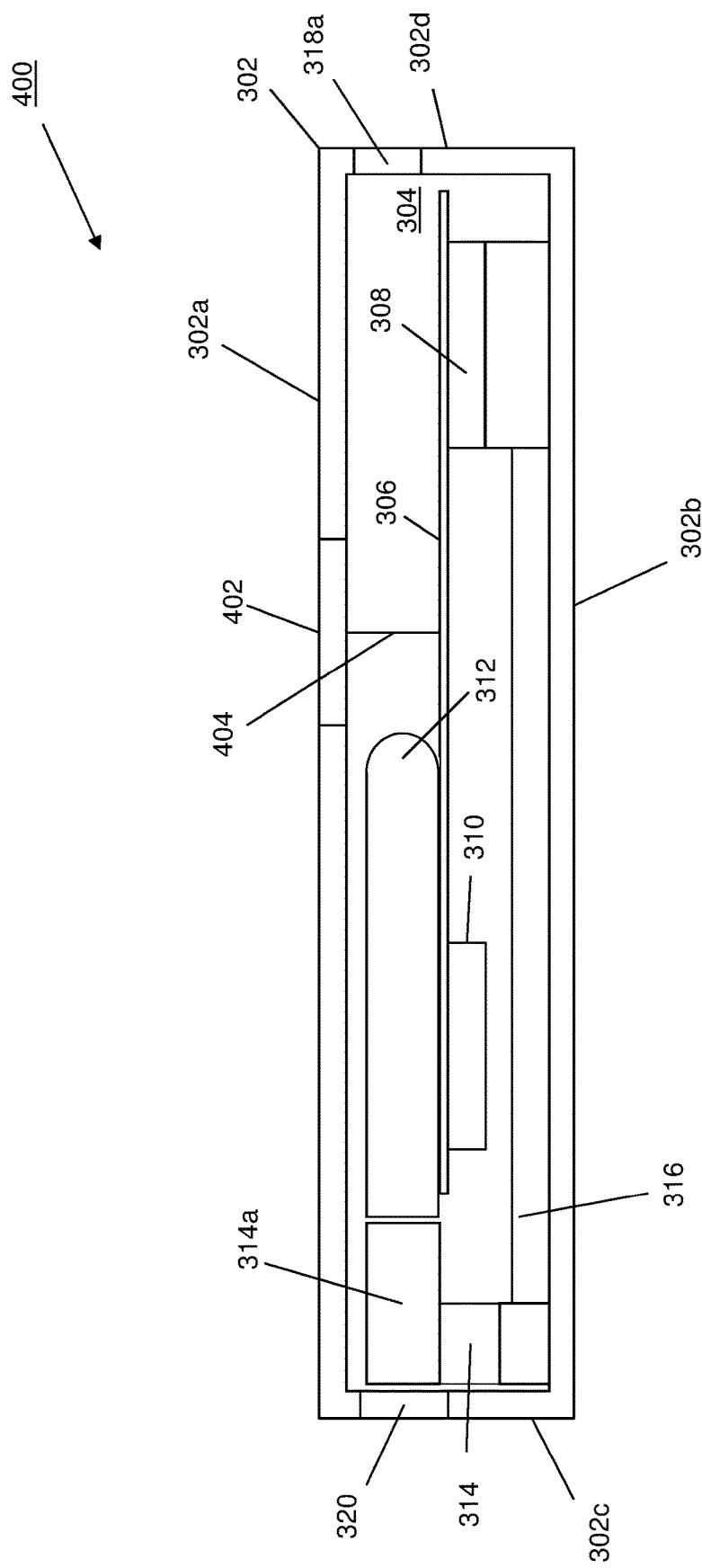
FIG. 4 is a partial, cross-sectional side view illustrating an embodiment of a computing module.

Referring now to FIG. 4, an embodiment of a computing module 400 is illustrated that is substantially similar to the computing module 300 of FIGS. 3A-3C and, as such, includes similar element numbers for similar components. One of skill in the art in possession of the present disclosure will recognize that the computing module 400 differs from the computing module 300 due to the provisioning of an expansion device connector 402 that is accessible on the computing chassis top outer surface 302a, and a connector coupling 404 extending between the expansion device connector 402 and the board 306. In the embodiments illustrated and discussed below, the computing module 300 may be utilized with the display stand chassis 200 that includes a first display stand support member that is configured (e.g., with the display stand cover 206) to define a relatively small display stand housing, providing a relatively small all-in-one computing device using the modular desktop computing system of the present disclosure. Furthermore, in the embodiments illustrated and discussed below, the computing module 400 may be utilized with the display stand chassis 200 that includes a second display stand support member that is configured (e.g., with the display stand cover 206) to define a relatively large display stand housing, providing a relatively larger all-in-one computing device using the modular desktop computing system of the present disclosure that may be configured (or configurable with expansion devices) to provide a relatively higher degree of performance compared to the computing module 300. However, while a few examples are provided, one of skill in the art in possession of the present disclosure will understand that the modular desktop computing system may utilize a variety of different computing modules to provide different functionality while remaining within the scope of the present disclosure as well.

Referring now to FIG. 5, an embodiment of a method 500 for providing a modular desktop computing system that is configurable as an all-in-one computing device is illustrated. As discussed below, embodiments of the systems and methods of the present disclosure provide modular desktop computing system with a computing module removeably housed in a display stand chassis that is configured to support any of a variety of display devices, with the computing module configurable to upgrade and/or add components to provide different operating levels for the modular desktop computing system. In specific examples, the modularity of the computing module allows for additions of and/or replacement of processing systems, memory systems, storage systems, networking systems, power systems, and/or any other computing components that would be apparent to one of skill in the art in possession of the present disclosure. Furthermore, the modularity of the display stand chassis allows for the housing of different sized computing modules, and different sizes and types of display devices. As such, the issues discussed above with regard to relatively weaker performance and relatively limited upgrade options on conventional all-in-one computing devices are remedied, as the modular desktop computing system of the present disclosure is configurable as an all-in-one computing device that provides a variety of use cases that allow a user to upgrade performance by adding or changing components, rather than being limited to the components that were initially integrated into the display device.

Figure 6A:
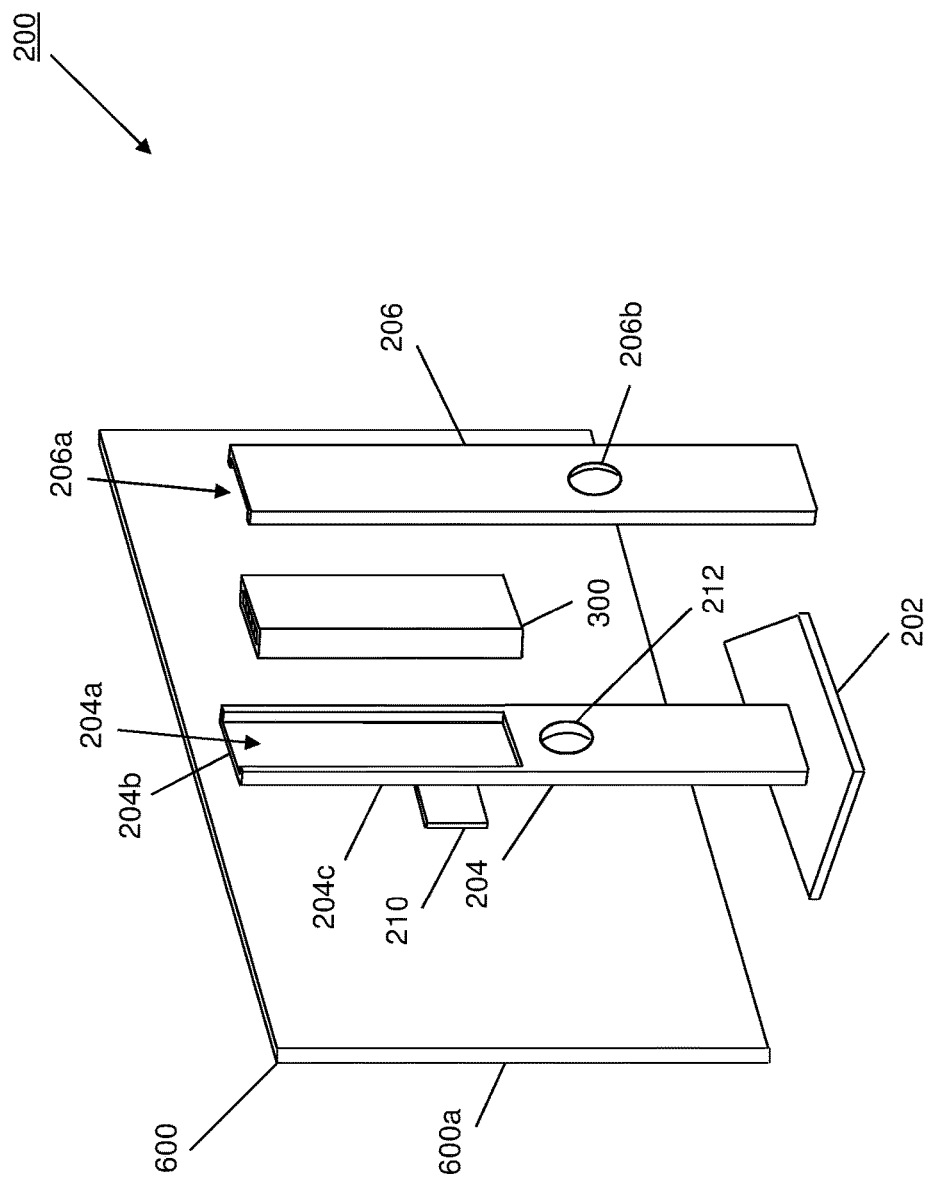
FIG. 6A is an exploded perspective view illustrating an embodiment of the computing module of FIGS. 3A-C used with the display stand chassis of FIGS. 2A-C and a display device.
Figure 6B:
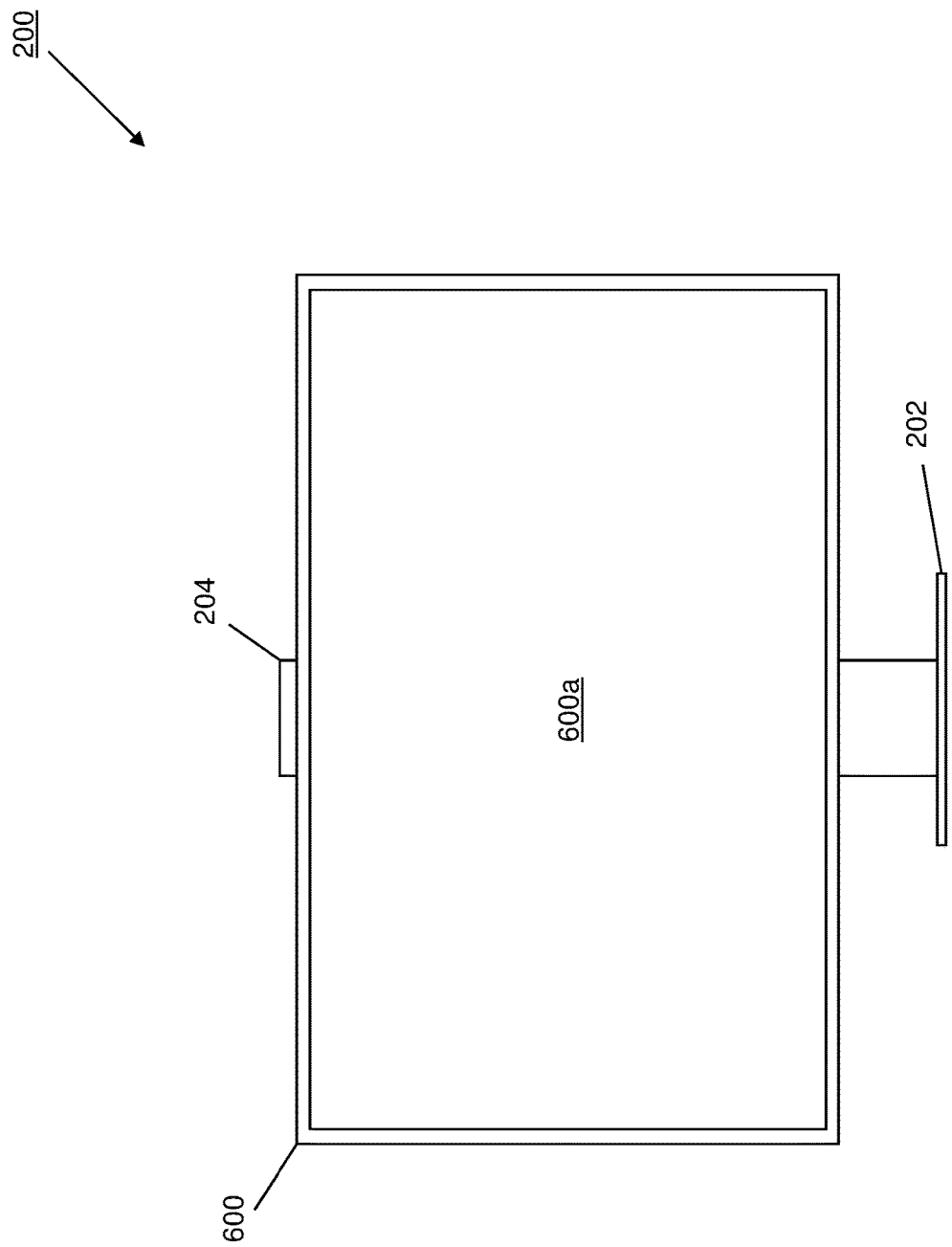
FIG. 6B is a front view illustrating an embodiment of the computing module, display stand chassis, and display device of FIG. 6A.

The method 500 begins at block 502 where a display device is mounted to a display stand chassis support member. Referring to FIGS. 6A, 6B, and 6C, in an embodiment of block 502, a display device 600 is coupled to the display stand chassis 200 via the display device mounting subsystem 210. As discussed above, the display device mounting subsystem 210 may be defined according to VESA specifications, and one of skill in the art in possession of the present disclosure will recognize that any of a variety of display devices desired by a user may be coupled to such a display device mounting subsystem 210 at block 502. The display device 600 includes a display screen 600a and, while not illustrated, may also include a variety of display device connectors (e.g., for connecting to the computing module as discussed below), as well as any other display device features that would be apparent to one of skill it the art in possession of the present disclosure.

The method 500 then proceeds to block 504 where a computing module is positioned in a computing module housing defined by the display stand chassis support member. With reference to FIGS. 6A and 6C, in an embodiment of block 504, the computing module 300 of FIGS. 3A-C may be positioned in the display stand chassis housing 208 defined between the display stand cover 206 and the display stand support member 204 (e.g., via the first display stand housing portion 204a and the second display stand housing portion 206a as discussed above.) While not illustrated, one of skill in the art in possession of the present disclosure will recognize that the display stand chassis 200 may include a variety of mounting structures, securing elements, connections (e.g., display connections, power connections, etc.), and/or any other features that enable the computing module 300 to be coupled to the display stand chassis 200 (e.g., in the display stand chassis housing 208), as well enable the components in the computing module 300 to be coupled to the display device 600, a power source, and/or other computing system elements (e.g., peripheral devices) while remaining within the scope of the present disclosure. As illustrated in FIGS. 6A and 6B, in an embodiment, the computing module 300 may be positioned in the display stand chassis housing 208 of the display stand chassis 200 such that the computing module heat dissipation aperture 320 is located immediately adjacent the display stand heat dissipation aperture 208a, and the computing chassis housing air inlet 318a is located adjacent the display stand chassis housing air inlet 206b such that air may be drawn from outside the display stand chassis 200 and into the computing chassis housing 304.

Figure 7A:
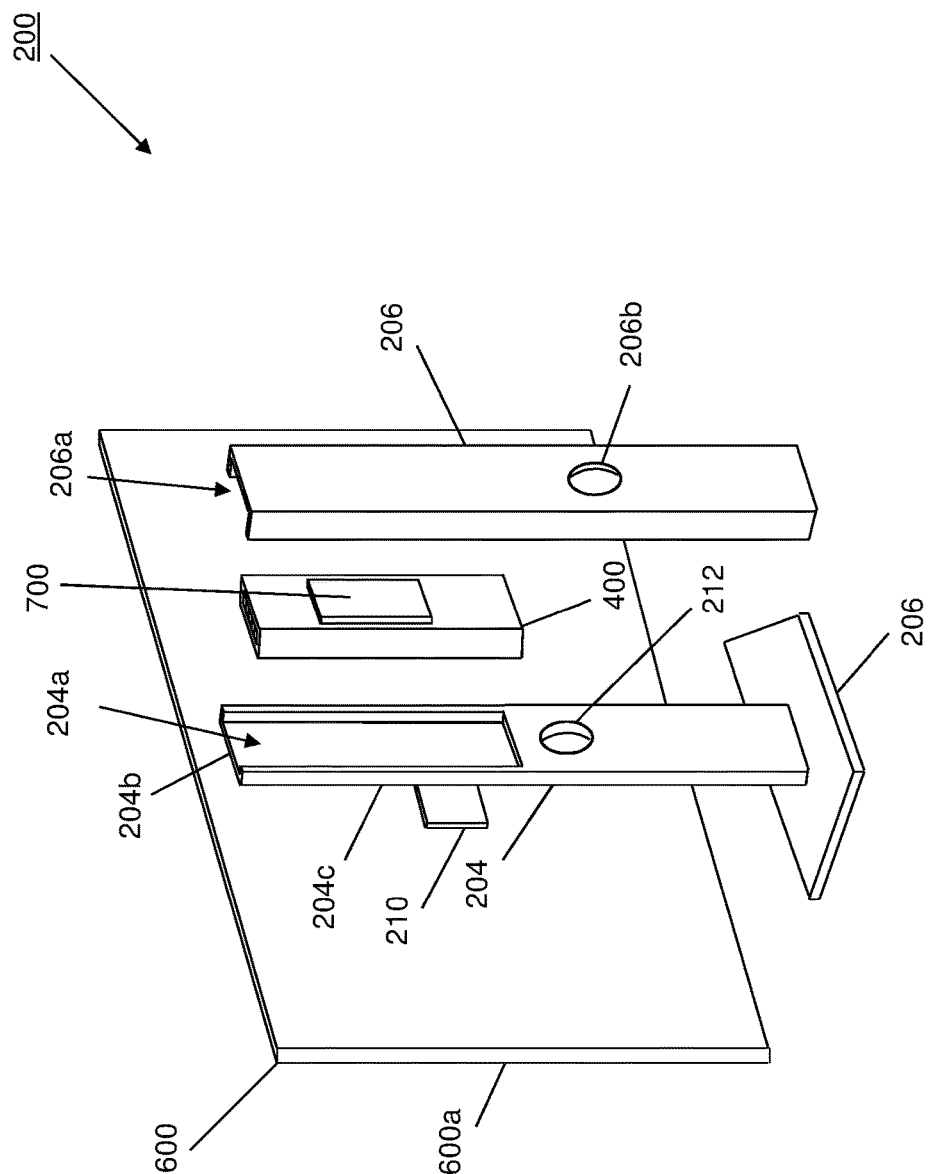
FIG. 7A is an exploded perspective view illustrating an embodiment of the computing module of FIG. 4 used with the display stand chassis of FIGS. 2A-C and a display device.
Figure 7B:
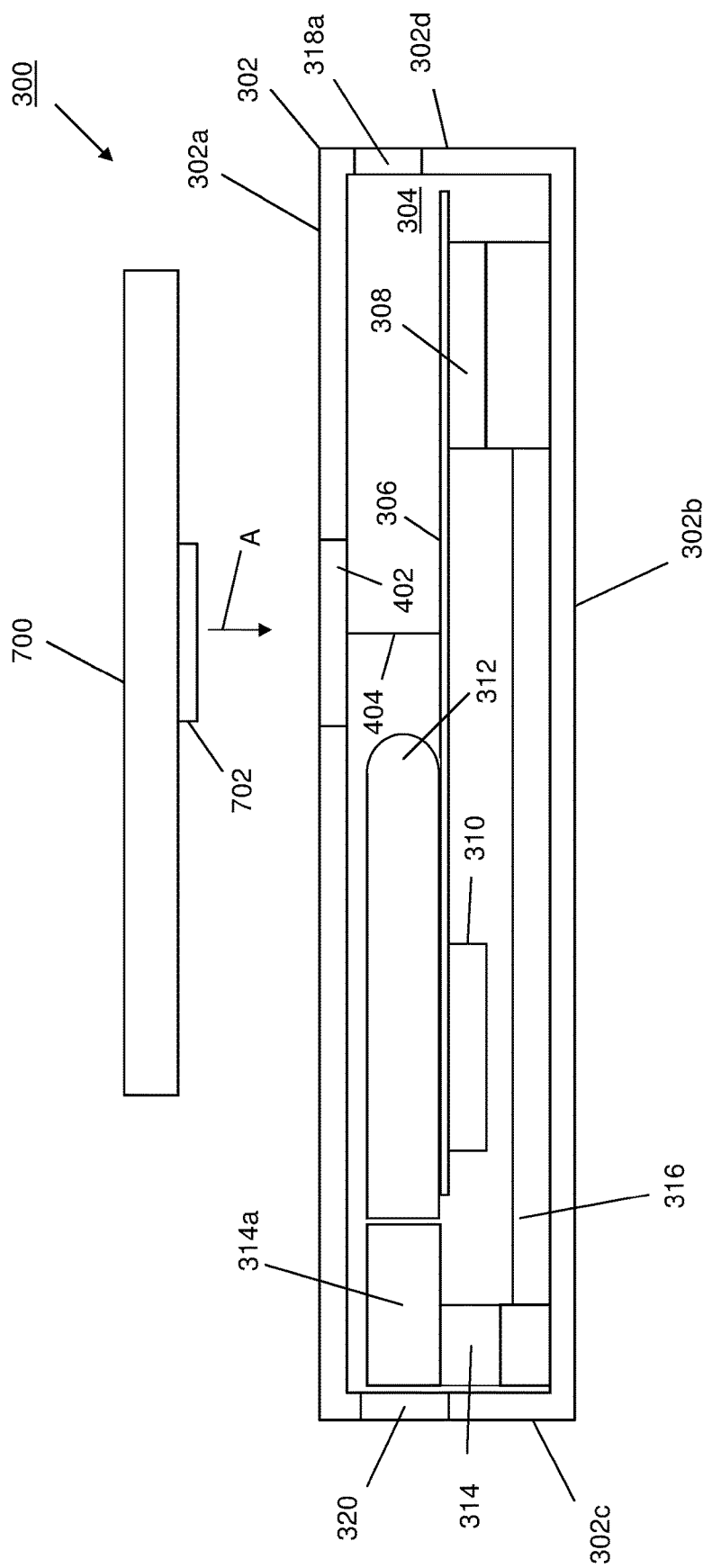
FIG. 7B is a partial cross-sectional side view illustrating an embodiment of an expansion device being coupled to the computing module of FIG. 4 for use with the display stand chassis of and the display device of FIG. 7A.
Figure 7C:
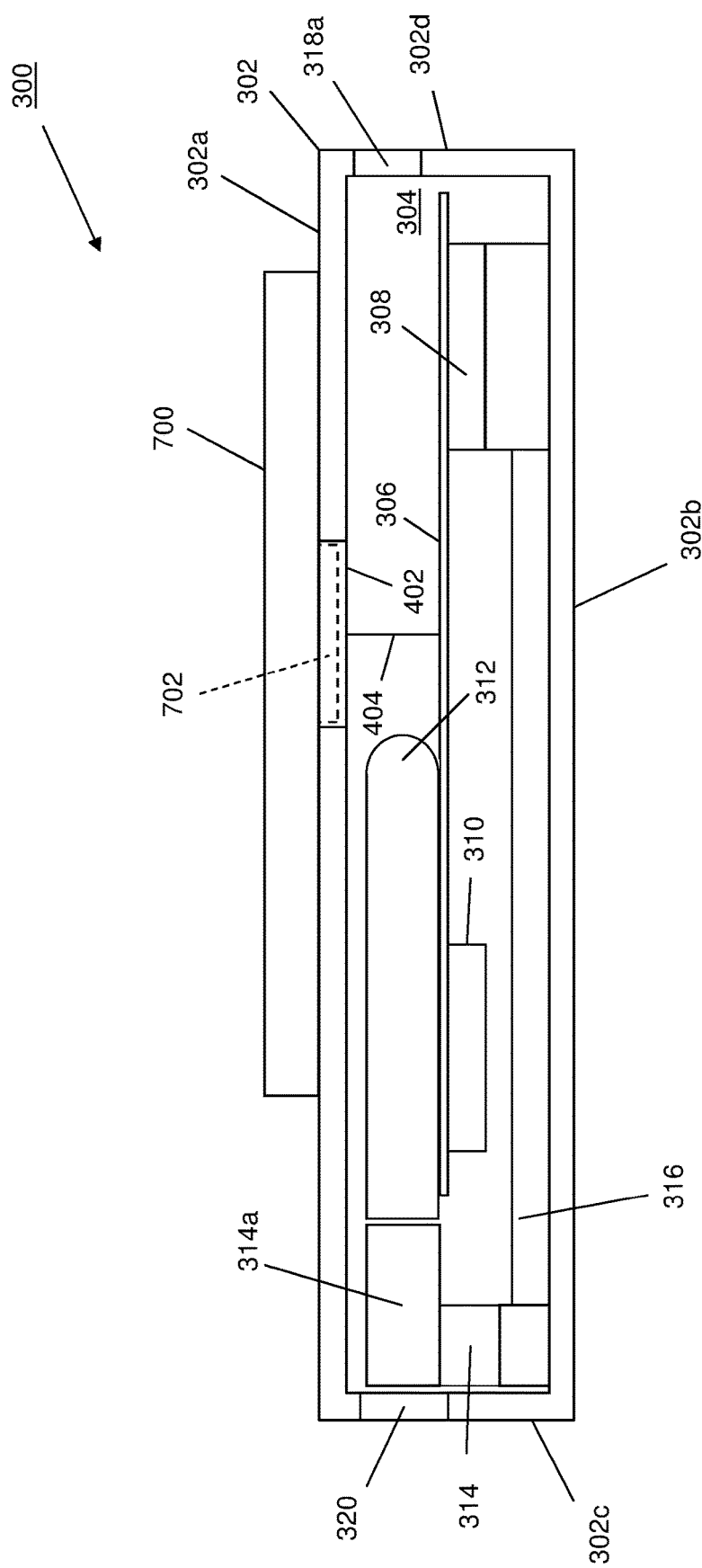
FIG. 7C is a partial cross-sectional side view illustrating an embodiment of the expansion device coupled to the computing module of FIG. 4 for use with the display stand chassis of and the display device of FIG. 7A.

With reference to FIG. 7A, an embodiment of the computing module 400 of FIG. 4 being positioned in a computing module housing defined by the display stand chassis support member is illustrated. As will be appreciated by one of skill in the art in possession of the present disclosure, the display stand chassis 200 in FIG. 7A may be substantially similar to the display stand chassis discussed above with reference to FIGS. 2A-C, and may be utilized in the embodiment discussed above with reference to FIGS. 6A-C, with the exception of including a display stand chassis housing (defined between the display stand cover 206 and the display stand support member 204 by the first display stand housing portion 204a and the second display stand housing portion 206a as discussed above) that is larger than the display stand chassis housing 208 discussed above with reference to FIGS. 6A-C. For example, as illustrated in FIGS. 7B and 7C, an expansion device 700 that includes a computing module connector 702 may be positioned adjacent the computing module 400 such that the computing module connector 702 is aligned with the expansion device connector 402 on the computing module 400, and then moved in a direction A so that the computing module connector 702 engages the expansion device connector 402 to couple the expansion device 700 to the computing module 400, as illustrated.

In different embodiments, the expansion module 700 may include a graphics processing device configured to enable the computing module 400 to perform graphics processing, a hard drive configured to provide additional storage for the computing module 400, a battery configured to provide additional power for the computing module 400, a networking device configured to provide networking functionality (e.g., wireless networking) for the computing module 400, and/or any other computing components for adding functionality to the computing module 400. In one specific example, the expansion device 700 may include an M.2 wireless device and a 2.5" Serial AT Attachment (SATA) drive, as well as a plurality of Display Port connectors and a DC connector. In another specific example, the expansion device 700 may include an M.2 Solid State Drive (SSD), and a 2.5" SATA drive, along with a DC connector. In yet another example, the expansion device 700 may include a battery and a DC connector. While not illustrated, the computing module 400 and/or the expansion device 700 may include a variety of coupling features for mechanically and electronically coupling the two together, as well as other features (e.g., heat sinks, etc.) that would be apparent to one of skill in the art in possession of the present disclosure.

As would be appreciated by one of skill in the art in possession of the present disclosure, the embodiments illustrated in FIGS. 6A-C and 7A-C provide just one example of the configurability of the modular desktop computing system of the present disclosure as an all-in-one computing device. For example, the display stand support member 204 may be the same in both embodiments, and different display stand covers (similar to the display stand cover 206) may be provided that, when coupled to the display stand support member 204, define different sized display chassis housings 208 that enable the positioning of different sized computing modules (e.g., a first sized display chassis housing for housing the computing module 300 in FIGS. 6A-C, a second larger sized display chassis housing for housing the computing module 400 and expansion device 700 in FIGS. 7A-C, etc.) However, while a specific example has been described, one of skill in the art in possession of the present disclosure will recognize that the display stand chassis 300 may be provided with other features for enabling the modularity described herein while remaining within the scope of the present disclosure.

The method 500 then proceeds to block 506 where the computing module is coupled to the display device. In an embodiment, at block 506, the computing module 300/400 may be coupled to the display device 600 in a variety of manners. For example, in some embodiments, the computing module 300/400 and the display device 600 may be coupled together via cabling, which may be connected to display device connectors (not illustrated) on the display device 600a and to computing module connectors (not illustrated) on the computing module 300/400, and routed through the cable routing aperture in the display stand chassis 200 provided by the display stand support member aperture 212 and the display stand cover aperture 206b. In other embodiments, the display device 600 and the computing module 300/400 may be each be connected to display stand chassis connectors (not illustrated) on the display stand chassis 200 in order to be coupled together (e.g., via internal connections within the display stand chassis 200). For example, the cabled connections between the display device 600 and the display stand chassis 200 may be provided, and the computing module 300/400 may include a connector for directly connecting to the display stand chassis 200 when it is positioned in the display stand chassis housing 208. However, while a few examples have been provided, one of skill in the art in possession of the present disclosure will recognize that the computing module 300/400 and the display device 600 may be coupled together in any of a variety of manners that will fall within the scope of the present disclosure as well.

The method 500 then proceeds to block 508 where a computing module provides for the display of images on the display device. In an embodiment, at block 508, the computing module 300/400 and the display device 600 may be operated such that the computing module 300/400 provides for the display of images on the display device 600 (e.g., via the connections provided between the two at block 506.) As would be understood by one of skill in the art in possession of the present disclosure, cooling subsystems in the computing module 300/400 (e.g., the forced convection device 312) may be operated at block 508 to dissipate heat generated within the computing module housing 304 via the display stand heat dissipation aperture 208a.

Figure 8:
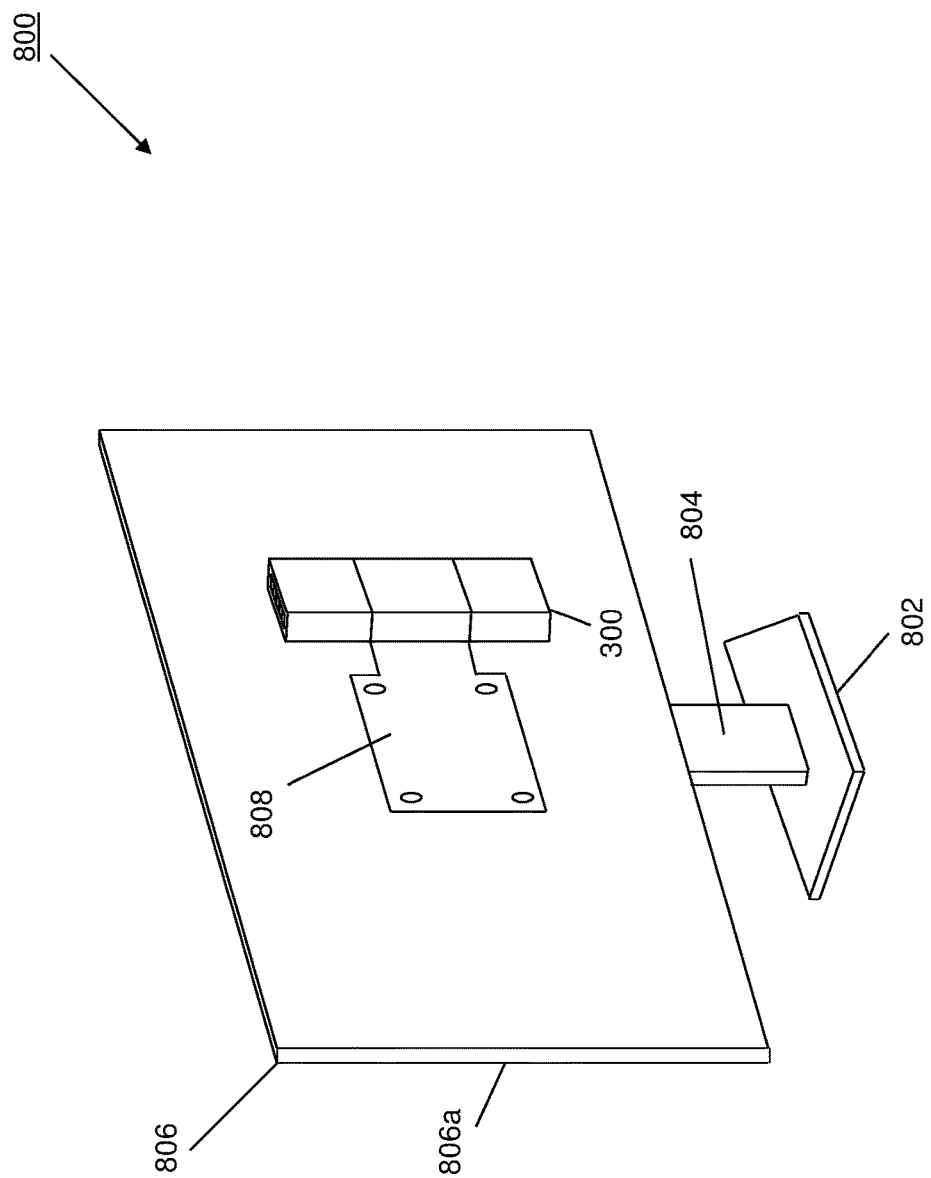
FIG. 8 is a rear perspective view illustrating the computing module of FIGS. 3A-C used with a display system.

Referring now to FIG. 8, an embodiment of the computing module 300 of FIGS. 3A-C utilized with a conventional display system 800 is illustrated. In the illustrated embodiment, the conventional display system 800 includes a display stand base 802, a display device support member 804 extending from the display stand base 802, and a display device 806 that is located on the display stand support member 804 and that includes a display screen 806a (not visible in FIG. 8, but substantially similar to the display screen 600a discussed above.) As illustrated in FIG. 8, a computing module mounting bracket 808 may be provided with the display device 806, and mounted to the display device 806 opposite the display device 800 from the display screen 806a (e.g., on the rear of the display device 806) via, for example, conventional mounting features that may be provided on the display device 806 according to VESA specifications. In another example, the computing module mounting bracket 808 may be utilized with a display device mounting arm in order to allow the mounting arm to couple to the display device and the computing module mounting bracket 808 so that the computing module 300 may be used with the display device mounted to the display device mounting arm. As also illustrated in FIG. 8, the computing module 300 may then be coupled to the display device 806 by positioning the computing module 300 in the computing module mounting bracket 808. While not illustrated, the computing module 300 may then be coupled to the display device 806 in substantially the same manner discussed above with regard to block 506 of the method 500, and then operate to display images on the display device 806 in substantially the same manner discussed above with regard to block 508 foo the method 500. As such, one of skill in the art in possession of the present disclosure will appreciate that the computing modules of the present disclosure may be utilized with conventional desktop computing system components (e.g., via the computing module mounting bracket 808 or similar subsystems) while remaining within the scope of the present disclosure as well.

Figure 9A:
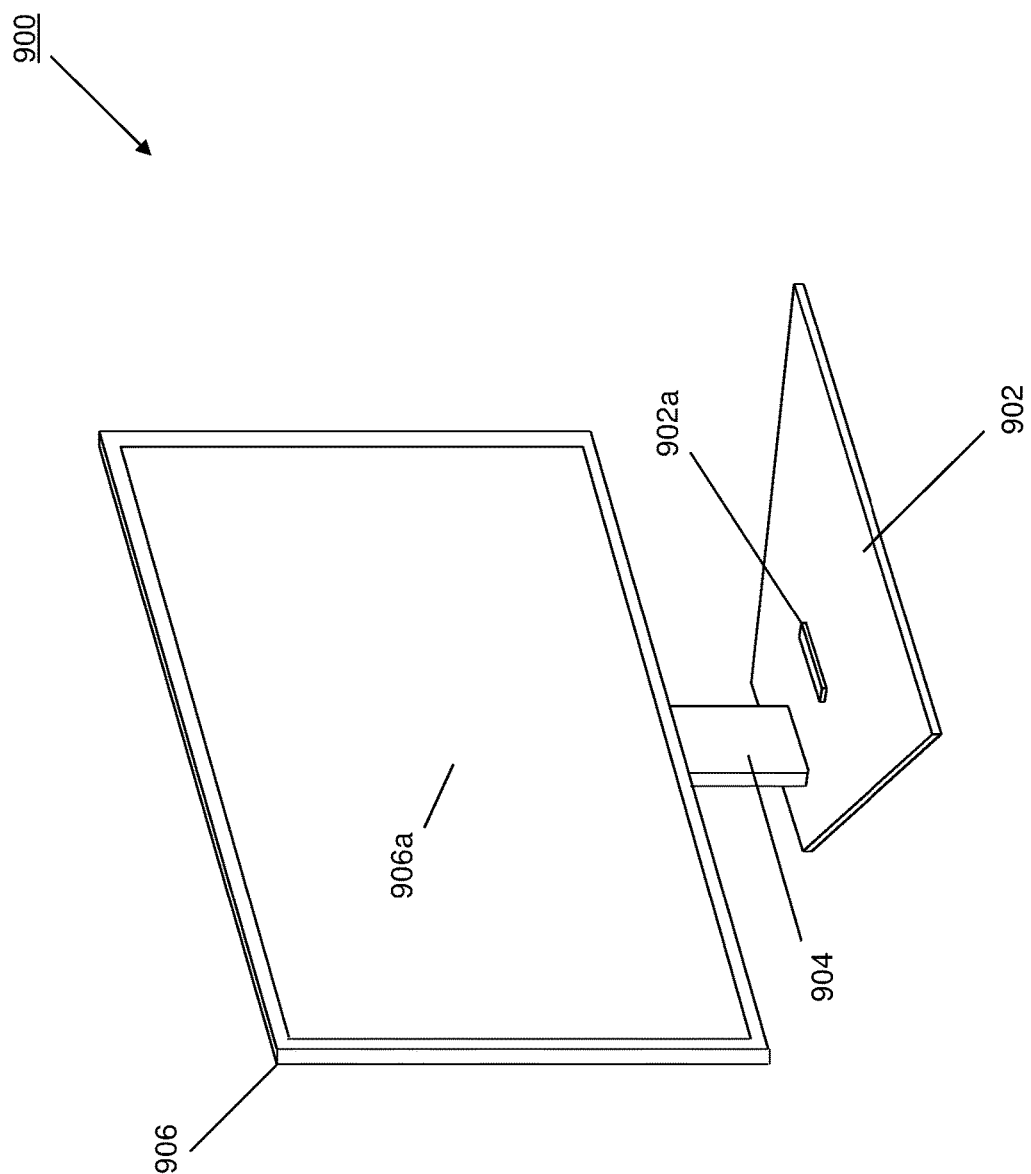
FIG. 9A is a front perspective view illustrating an embodiment of a display system with an integrated docking subsystem.
Figure 9B:
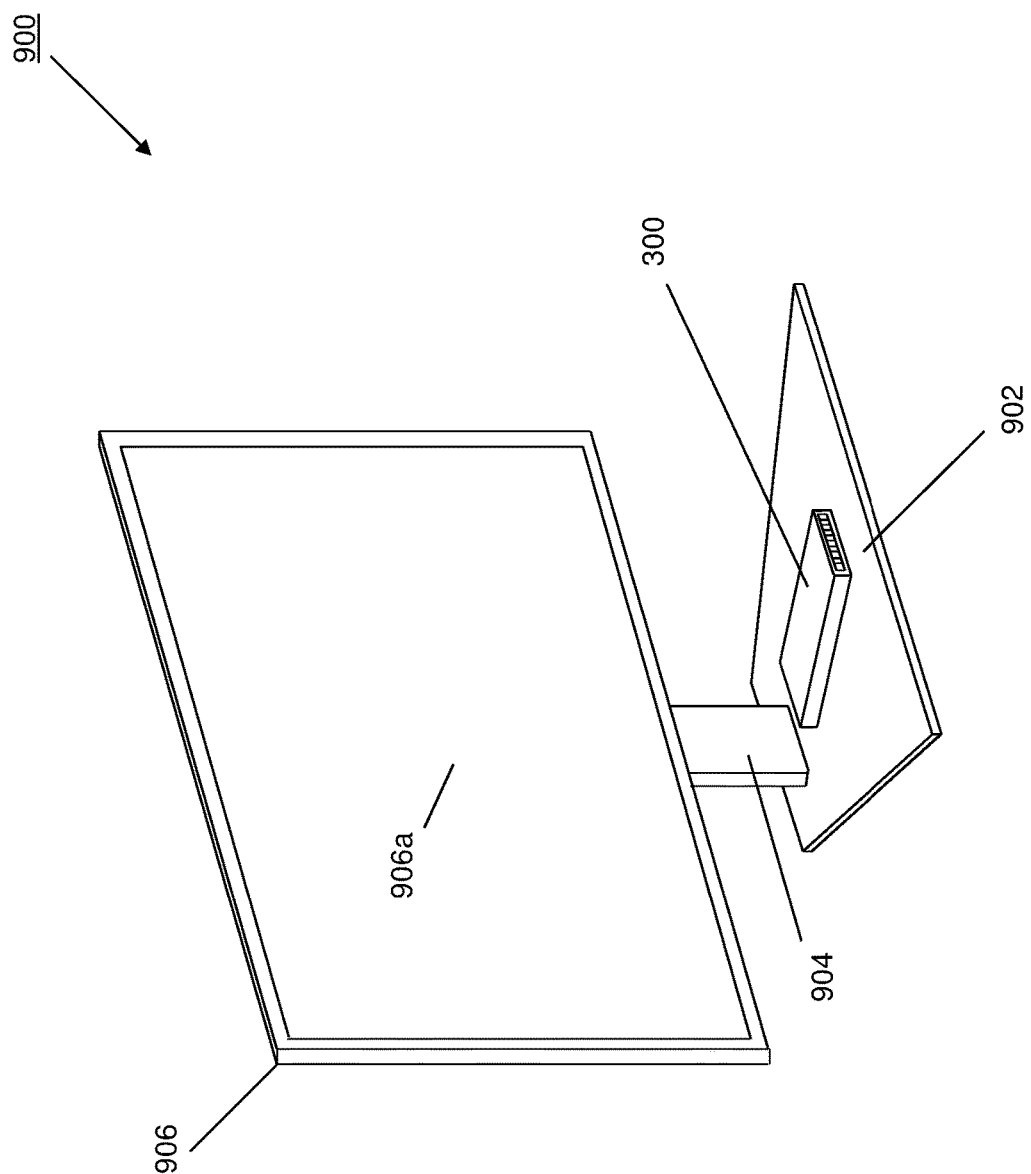
FIG. 9B is a front perspective view illustrating an embodiment of the computing module of FIGS. 3A-C connected to the display system with the integrated docking subsystem of FIG. 9A.

Referring now to FIGS. 9A and 9B, an embodiment of the use of the computing module 300 of FIGS. 3A-C with a display system 900 is illustrated. The display system 900 includes a display stand base 902 having a docking connector 902a, a display device support member 904 extending from the display stand base 902, and a display device 906 that is coupled to the display stand support member 904 and that includes a display screen 906a. Similar as discussed above, the display device 906 may be mounted to the display device support member 904 via, for example, conventional mounting features that may be provided according to VESA specifications. As illustrated in FIG. 9B, the computing module 300 may be coupled to the display device 806 by connecting the computing module 300 to the docking connector 902a (e.g., via a connector on the computing module 300, not visible in FIG. 9B but similar to the expansion device connector 402 illustrated in FIG. 4). As such, the computing module 300 may be electrically coupled to the display device 906 via the docking connector at block 506 of the method 500, and then operates to display images on the display device 906 in substantially the same manner discussed above with regard to block 508 of the method 500. As such, one of skill in the art in possession of the present disclosure will appreciate that the computing modules of the present disclosure may be utilized with display stand chassis having an integrated docking connector while remaining within the scope of the present disclosure as well.

Thus, systems and methods have been described that provide a modular desktop computing system that provide for the removeable positioning of a computing module into a display stand chassis that is also configured to support any of a variety of display devices, with the computing module configurable to upgrade and/or add components to provide different operating levels for an all-in-one computing device. The modularity of the system allows for additions of and/or replacement of processing systems, memory systems, storage systems, networking systems, power systems, and any other computing components that would be apparent to one of skill in the art in possession of the present disclosure. Furthermore, the modularity of the display stand chassis allows for the housing of different sized computing modules, and different sizes and types of display devices. As such, issues with regard to weaker performance and limited upgrade options on conventional all-in-one computing devices are remedied, as the modular desktop computing system of the present disclosure may be provided as an all-in-one computing device while allowing a user to upgrade its performance by adding or changing components, rather than being limited to the components that were initially integrated into the display device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A modular computing system, comprising:
   a display device including a display device computing module connector;
   a display stand chassis including:
      a plurality of display stand chassis walls;
      a display device mounting subsystem that is included on at least one of the plurality of display stand chassis walls and that is configured to mount the display device to the display stand chassis; and
      a computing module chassis enclosure that is defined between the plurality of display stand walls;
   a computing module including:
      a computing module chassis that is configured to be positioned in the computing module chassis enclosure, wherein the computing module chassis includes:
         a plurality of computing module chassis walls; and
         a computing module chassis housing that is defined between the plurality of computing module chassis walls such that every side of the computing module chassis housing is located immediately adjacent a respective one of the plurality of computing module chassis walls;
      a plurality of computing components that are located in the computing module chassis housing and that include:
         a circuit board;
         a processing system that is mounted to the circuit board;
         a memory system that is mounted to the circuit board and coupled to the processing system;
         a computing module display device connector that is coupled to the circuit board and accessible on the computing module chassis;
         a computing module power connector that is coupled to the circuit board and accessible on the computing module chassis;
      a display cable that is configured to connect to each of the display device computing module connector and the computing module display device connector; and
      a power cable that is configured to connect to the computing module power connector and a power source.

2. The system of claim 1, wherein at least one of the display stand chassis walls is provided by a display stand cover that is configured to connect to at least one other of the display stand chassis walls to define the computing module chassis enclosure between them.

3. The system of claim 1, wherein the display stand chassis defines an aperture,
wherein the display cable is configured to extend from the computing module display device connector, out of the computing module chassis enclosure, through the aperture, and to the display device computing module connector, and
wherein the power cable is configured to extend from the computing module power connector, out of computing module chassis enclosure, through the aperture, and to the power source.

4. The system of claim 1, further comprising:
a computing module networking connector that is coupled to the circuit board and accessible on the computing module chassis; and
a networking cable that is configured to connect to the computing module networking connector and a networking device.

5. The system of claim 1, further comprising:
a forced cooling device that is located in the computing module chassis housing.

6. The system of claim 1, wherein the computing module chassis enclosure does not house any circuit boards, processing systems, or memory systems when the computing module chassis is not positioned in the computing module chassis enclosure.

7. The system of claim 1, wherein at least one of the plurality of computing module chassis walls is configured to provide an opening to the computing module chassis housing that allows at least one of the plurality of computing components to be replaced.

8. An Information Handling System (IHS), comprising:
a display stand chassis that is configured to support a display device and that includes a plurality of display stand chassis walls that define a computing module chassis enclosure between them; and
a computing module including:
a computing module chassis that is configured to be positioned in the computing module chassis enclosure, wherein the computing module chassis includes:
a plurality of computing module chassis walls; and
a computing module chassis housing that is defined between the plurality of computing module chassis walls such that every side of the computing module chassis housing is located immediately adjacent a respective one of the plurality of computing module chassis walls; and
a plurality of computing components that are located in the computing module chassis and that include:
a circuit board;
a processing system that is mounted to the circuit board; and
a memory system that is mounted to the circuit board and coupled to the processing system.

9. The IHS of claim 8, further comprising:
a computing module display device connector that is coupled to the circuit board, accessible on the computing module chassis, and configured to connect the circuit board to the display device via a display cable when the display device is supported by the display stand chassis; and
a computing module power connector that is coupled to the circuit board, accessible on the computing module chassis, and configured to connect to the circuit board to a power source via a power cable.

10. The IHS of claim 9, wherein the display stand chassis defines an aperture,
wherein the display cable is configured to extend from the computing module display device connector, out of the computing module chassis enclosure, through the aperture, and to the display device, and
wherein the power cable is configured to extend from the computing module power connector, out of computing module chassis enclosure, through the aperture, and to the power source.

11. The IHS of claim 8, wherein at least one of the display stand chassis walls is provided by a display stand cover that is configured to connect to at least one other of the display stand chassis walls to define the computing module chassis enclosure between them.

12. The IHS of claim 8, further comprising:
a forced cooling device that is located in the computing module chassis housing.

13. The IHS of claim 8, wherein the computing module chassis enclosure does not house any circuit boards, processing systems, or memory systems when the computing module chassis is not positioned in the computing module chassis enclosure.

14. The IHS of claim 8, wherein at least one of the plurality of computing module chassis walls is configured to provide an opening to the computing module chassis housing that allows at least one of the plurality of computing components to be replaced.

15. A method for providing a modular computing system, comprising:
connecting, by a display stand chassis, to a display device;
receiving, by a computing module chassis enclosure that is defined between a plurality of display stand chassis walls that are included on the display stand chassis, a computing module having a computing module chassis that includes a plurality of computing module chassis walls that define a computing module chassis housing between them such that every side of the computing module chassis housing is located immediately adjacent a respective one of the plurality of computing module chassis walls; and
coupling, by a plurality of computing components that are located in the computing module chassis, to the display device.

16. The method of claim 15, further comprising:
coupling, by a circuit board that included in the plurality of computing components, to the display device via a display cable; and
coupling, by the circuit board that included in the plurality of computing components, to the power source via a power cable.

17. The method of claim 16, further comprising:
routing, by the display cable that couples the circuit board to the display device, from a computing module display device connector that is connected to the circuit board and that is accessible on the computing module chassis, out of the computing module chassis enclosure, through an aperture defined by the display stand chassis, and to the display device; and
routing, by the power cable that couples the circuit board to the power source, from a computing module power connector that is connected to the circuit board and that is accessible on the computing module chassis, out of the computing module chassis enclosure, through the aperture defined by the display stand chassis, and to the power source.

18. The method of claim 15, further comprising:
connecting, by a display stand cover that provides one of at least one of the display stand chassis walls, to at least one other of the display stand chassis walls to define the computing module chassis enclosure.

19. The method of claim 15, wherein the plurality of computing components include a circuit board, a processing system mounted to the circuit board, and a memory system mounted to the circuit board and coupled to the processing system, and wherein the computing module chassis enclosure does not house any circuit boards, processing systems, or memory systems when the computing module chassis is not positioned in the computing module chassis enclosure.

20. The method of claim 15, further comprising:
providing, via at least one of the plurality of computing module chassis walls, an opening to the computing module chassis housing to allow at least one of the plurality of computing components to be replaced.

* * * * *